Patented Feb. 6, 1951

2,540,118

UNITED STATES PATENT OFFICE 2,540,118

PROCESS FOR THE MANUFACTURE OF PENTAENES

Otto Isler, Basel, Switzerland, assignor to Hoffmann-La Roche Inc., Nutley, N. J., a corporation of New Jersey No Drawing. Application June 7, 1947, Serial No. 753,383

In Switzerland December 31, 1946

12 Claims. (Cl. 260—611)

This invention relates to the manufacture of pentaenes.

Various syntheses for the preparation of vitamin A ethers have been described. According to the known methods, the carbon skeleton of vitamin A consisting of 20 carbon atoms is built up as follows: 6-(2',6',6'-trimethyl-cyclohexene-(1')-yl-4-methyl-hexadiene-(3,5) - yne - (1) and 6 - (2',6',6'-trimethyl-cyclohexene - (1')-yl)-3-hydroxy-4-methyl-hexene-(4)-yne-(1) are condensed with ethers of 1-hydroxy-butanone-(3) ($C_{16}+C_4=C_{20}$; cf. U. S. A. Specifications Nos. 2,369,157 and 2,382,086). Alternatively, 4-(2',6',6' - trimethyl - cyclohexene - (1') - yl) - 2-methyl-butene-(2)-al-(1) is reacted with 1-methoxy-3-methyl-pentene-(2)-yne-(4) or with ethers of 1,3-dihydroxy-3-methyl-pentyne-(4). $C_{14}+C_6=C_{20}$, cf. Experientia, vol. 2, year 1946, page 31; U. S. A. Specification No. 2,369,157; Festschrift Emil Barell, Basel, year 1946, page 31; Science, vol. 103, year 1946, page 581). Finally, it has become known in the form of preliminary communications that syntheses of the vitamin A methyl ether can be carried out as follows. Reacting 5-(2',6',6'-trimethyl-cyclohexene - (1')-yl)-3-hydroxy-3-methyl - pentene-(4)-yne-(1) with 1-methoxy-3-methyl-4-chloro-butene-(2) $C_{15}+C_5=C_{20}$; cf. Journal of the American Chemical Society, vol. 67, year 1945, page 1627), or reacting 4-(2',6',6'-trimethyl-cyclohexene-(1')-yl)-butene-(3) - one - (2) (β-ionone) with 1 - methoxy - 3-methyl-6-bromo-hexadiene-(2,4) ($C_{13}+C_7=C_{20}$; cf. Chemistry and Industry, vol. 58, year 1939, page 802).

The last two syntheses are not supported by any biological tests, and the ultra-violet absorption spectrum published in connection therewith shows no absorption maxima at 328 mμ as would be characteristic for vitamin A ethers (cf. Journal of the American Chemical Society, vol. 67, year 1945, page 1627).

It has now been found, according to the present invention, that vitamin A ethers can be obtained by condensing β-ionone with an ether of 1-hydroxy-3-methyl-6-halogeno-hexene-(2)-yne-(4) by means of zinc, cadmium or magnesium, but preferably zinc, and, in optional sequence, partially hydrogenating and dehydrating the ether of 1-hydroxy-3,7-dimethyl-7-hydroxy - 9 - trimethyl - cyclohexenyl - nonadiene-(2,8)-yne-(4) thus formed.

The synthesis is illustrated by the following formulae:

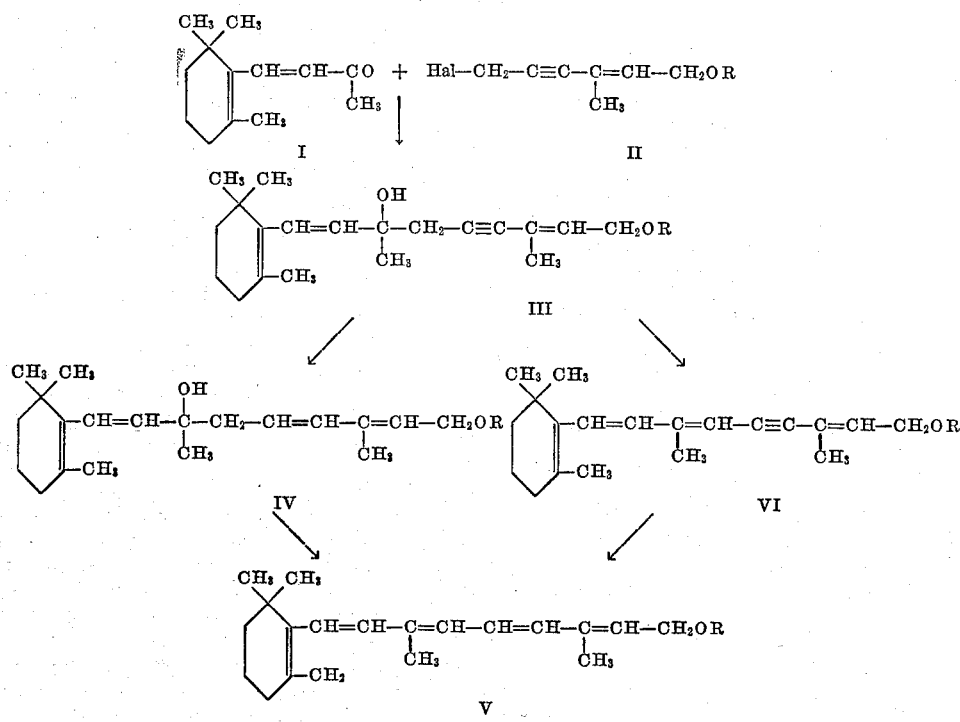

R=lower alkyl (hydrocarbon radical)

According to the present invention, the synthesis of vitamin A ethers may be carried out as follows: Reacting β-ionone (I) containing 13 carbon atoms in the molecule with an ether of a substituted propargyl halide (II) containing 7 carbon atoms in the molecule. Thus, the ether of a condensation product (III) having 20 carbon atoms in the molecule is obtained. The latter condensation product possesses one triple bond and three double bonds, only two of which are conjugated with respect to one another. From this compound the system of the vitamin A ethers having 5 double bonds conjugated with respect to one another is built up by partial hydrogenation of the triple bond and by dehydration in order to introduce a further double bond.

The ethers of 1-hydroxy-3-methyl-6-halogeno-hexene-(2)-yne-(4) used for the condensation with β-ionone were not hitherto known. They may be prepared in the following manner from 3-hydroxy-3-methyl-pentene-(1)-yne-(4), or from the ethers of 1-hydroxy-3-methyl-pentene-(2)-yne-(4); 3-hydroxy-3-methyl-pentene-(1)-yne-(4) is halogenated with phosphorus tribromide, and the primary bromide thus formed is etherified with an alkali metal alcoholate. 1-methoxy-3-methyl-pentene-(2)-yne-(4) is known (see, for example, Festschrift Emil Barell, year 1946, page 40). The 1-butoxy-3-methyl-pentene-(2)-yne-(4) boils at 71° C. to 74° C. under a pressure of 10 mm. Hg; $n_D^{19}=1.4540$. 1-phenoxy-3-methyl-pentene-(2)-yne-(4) boils at 75° C. to 78° C. under a pressure of 0.05 mm. Hg; $n_D^{22}=1.518$. The ethers of 1-hydroxy-3-methyl-pentene-(2)-yne-(4) are condensed with formaldehyde by methods known per se. From 1-methoxy-3-methyl-pentene-(2)-yne-(4) and 33 per cent. aqueous formaldehyde, in a manner analogous to the method described in Swiss Specification No. 223,202, 1-methoxy-3-methyl-6-hydroxy-hexene-(2)-yne-(4) can be obtained in a 70 per cent. yield in the presence of copper catalysts in a sealed vessel at 120° C. Its boiling point is 127–129° C. under a pressure of 15 mm. Hg; $n_D^{22}=1.496$. The ethers of 1-hydroxy-3-methyl-6-hydroxy-hexene-(2)-yne-(4) are transformed, preferably immediately before condensation with zinc, cadmium or magnesium is performed, in ethereal solution and by the action of a phosphorus trihalogenide in the presence of a small proportion of pyridine, into the ethers of 1-hydroxy-3-methyl-6-halogeno-hexene-(2)-yne-(4). They are liquids of very low viscosity which irritate the mucous membrane. 1-methoxy-3-methyl-6-bromo-hexene-(2)-yne-(4) is an oil, clear as water, $n_D^{21}=1.524$.

The first step of the process of the present invention is a condensation by means of zinc, cadmium or magnesium, by which ethers of 1-hydroxy-3-methyl-6-halogeno-hexene-(2)-yne-(4) and β-ionone are combined with each other, similar to a Reformatski synthesis. The reaction may be carried out in an inert solvent, dry ethyl ether being especially suitable. Preferably, excess halide is employed, and the solution of the reaction components is allowed to flow into the warmed condensing agent, e. g. zinc powder, while stirring vigorously. The zinc, cadmium or magnesium compound of the condensation product formed is hydrolysed in the usual manner, for example by means of 1 per cent. sulphuric acid. Non-reacted β-ionone may be separated off in the form of a crystallising derivative, for example, as its semi-carbazone. The ethers of 1-hydroxy-3,7-dimethyl-7-hydroxy-9-trimethyl-cyclohexenyl-nonadiene-(2,8)-yne-(4) formed may be purified by partition between solvents, such as low boiling petroleum ether and aqueous methyl alcohol, or by careful distillation in high vacuum.

The purified condensation products are viscous, yellow oils, not absorbing any ultra-violet rays of higher wave length than 260 mμ. Determination according to Zerewitinoff yields values for 1 active hydrogen atom, and, on heating, the condensation products split off water easily.

Thereupon, condensation product III is subjected, preferably after purification, to partial hydrogenation of the triple bond. Means usually employed for polyene compounds may be applied, such as, for example, treatment with zinc and acetic acid, with sodium amalgam and a basic agent, or with sodium in liquid ammonia. Catalytic hydrogenation by means of palladium charcoal unto which quinoline has been adsorbed prior to use, or palladium-calcium carbonate or palladium-barium sulphate as catalyst has proved to be especially suitable. In catalytic partial hydrogenation, the introduction of hydrogen is discontinued after the calculated quantity of hydrogen has been taken up. It is not necessary to isolate and to purify the hydrogenation product, i. e., the ether of 1-hydroxy-3,7-dimethyl-7-hydroxy-9-trimethyl-cyclohexenyl-nonatriene-(2,4,8). It is a viscous, yellowish oil.

In order to introduce a further double bond, product IV of the partial hydrogenation, i. e., the ether of 1-hydroxy-3,7-dimethyl-7-hydroxy-9-trimethyl-cyclohexenyl-nonatriene-(2,4,8) is subjected to dehydration. The usual methods may be employed (cf. Houben-Weyl, "Methoden der organischen Chemie," 3rd edition, vol. III, pages 947–952), provided the desired pentaene remains stable and no fission of the carbon-chain of compound IV occurs. For dehydration purposes, agents splitting off water, such as oxalic acid, phenyl isocyanate, aluminum hydroxide, magnesium methyl bromide, may be employed. It is of advantage to boil in an inert solvent of boiling point above 100° C., such as toluene. The further double bond may also be introduced by esterifying compound IV with an organic acylating agent and splitting off acid from the ester formed by heating, preferably in the presence of an alkaline medium. Furthermore, dehydration can also be arrived at by replacing, under careful conditions, the hydroxy group by halogen whereupon hydrogen halide is slit off by means of alkaline medium. Thus, for example, reaction with phosphorus trichloride in the presence of pyridine and subsequent heating with methyl alcoholic alkali hydroxide at 60° C. to 70° C. has proved suitable.

Pentaenes (vitamin A ethers) can also be obtained by the following process with interchanged reaction sequence. Condensation product III ether of 1-hydroxy-3,7-dimethyl-7-hydroxy-9-trimethyl-cyclohexenyl-nonadiene-(2,8)-yne-(4) is first subjected to dehydration, and the compound thus formed is partially hydrogenated at the triple bond by the action of 1 mol of hydrogen. This process is illustrated by Formulae I, II, III, VI and V in the above formulae. The measures to be taken for each step are the same as described above. It is possible to combine several steps.

For the preparation of vitamin A methyl ether, β-ionone and 1-methoxy-3-methyl-6-bromo-hexene-(2)-yne-(4) are condensed in an ethereal solution by means of zinc, cadmium or magnesium. The 1-methoxy-3,7-dimethyl-7-hydroxy - 9 - trimethyl - cyclohexenyl - nonadiene-(2,8)-yne-(4) thus formed is hydrogenated with 1 mol of hydrogen at the triple bond by the action of hydrogen in the presence of palladium-calcium carbonate as catalyst. The 1-methoxy-3,7 - dimethyl - 7 - hydroxy - 9 - trimethyl-cyclohexenyl-nonatriene-(2,4,8) obtained is treated with agents capable of splitting off water, preferably in the presence of a solvent. Alternatively, the process may be carried out as follows: For dehydrating purposes, the 1-methoxy-3,7-dimethyl - 7 - hydroxy - 9 - trimethyl - cyclohexenyl-nonatriene-(2,4,8) may be reacted with 1 mol of phosphorus trichloride in the presence of pyridine, whereupon the 1-methoxy-3,7-dimethyl - 7 - chloro - 9 - trimethyl - cyclohexenyl-nonatriene-(2,4,8) obtained is heated with alkali hydroxide in methyl alcohol or pyridine.

The products obtained in accordance with the present process, i. e., vitamin A ethers, may be purified by the same methods as are known for high concentrates of vitamin A and its derivatives obtained from natural sources (i. e. partition between solvents, chromatographic adsorption, careful distillation and the like). As required for vitamin A preparations from natural sources, the products of the present process must be protected against the destructive influence of light, air and heat. It is advisable to add anti-oxidants which may also be present during the various steps of the synthesis; tocopherols have proved to be especially suitable as anti-oxidants.

*Example 1*

A solution of 5.6 parts by weight of 1-methoxy-3-methyl-6-bromo-hexene-(2)-yne-(4) and 3 parts by weight of β-ionone in 20 parts by volume of ether are allowed to flow in a nitrogen atmosphere into 4 parts by weight of warmed zinc powder in the course of half an hour while stirring vigorously, the reaction heat being sufficient to keep the solvent boiling under a reflux condenser. When the intensity of the reaction decreases, the mixture is heated for a short time, cooled down and decomposed with ice and dilute sulphuric acid. Thereupon it is taken up in ether, successively washed with 1 per cent. sulphuric acid and water, dried, and the solvent is evaporated. The residue is dissolved in methyl alcohol, semi-carbazide is added, and the mixture is left to stand for 12 hours. The mixture is filtered, double the quantity of water is added, then it is taken up in petroleum ether of boiling range 30-70° C., and the petroleum ether solution is shaken out several times with 90 per cent. methyl alcohol. From the methanol extract 3 to 3.5 parts by weight of 1-methoxy-3,7-dimethyl - 7 - hydroxy - 9 - trimethyl - cyclohexenyl-nonadiene-(2,8)-yne-(4) are obtained in the form of a viscous, yellowish oil. $n_D^{20}=1.515$. The yield, calculated for β-ionone, amounts to 65-70 per cent.

10 parts by weight of this condensation product are dissolved in 100 parts by volume of methyl alcohol and hydrogenated at room temperature by means of 0.5 part by weight of 4 per cent. of palladium-calcium carbonate catalyst. After 1 mol of hydrogen has been taken up, the hydrogenation is interrupted and the catalyst separated off. In order to remove by-products (formed by premature dehydration), 6 parts of water are added to the filtrate and the mixture is shaken out with a small quantity of petroleum ether of boiling range 30°-60° C. The methyl alcohol solution is then diluted with 200 parts of water, shaken out with petroleum ether, and the petroleum ether extracts are dried and concentrated. Thus, 8 to 9 parts by weight of 1-methoxy - 3,7 - dimethyl - 7 - hydroxy - 9 - trimethyl-cyclohexenyl-nonatriene-(2,4,8) are obtained as a yellowish, viscous oil; $n_D^{20}=1.512$. The Zerewitinoff analysis yields values for 1 active hydrogen atom. Determination of ultra-violet absorption does not show any absorption above 260 mμ. When fed to vitamin A deficient rats, the compound clearly promotes their growth.

A solution of 0.7 part by weight of phosphorus tribromide in 30 parts by volume of petroleum ether of boiling range 30-60° C. is added in the course of one hour to a mixture of 4 parts by weight of the product obtained by the partial hydrogenation in 50 parts by volume of petroleum ether of boiling range 30-60° C. in the presence of 1 part by volume of pyridine. After the whole quantity has been added, stirring at 0° C. is continued for 1 hour, the reaction solution is decanted from a small portion of a brown precipitate, ice is added and the mixture is washed with water, dried with sodium sulphate, and the solvent is evaporated. The residue is dissolved in 40 parts by volume of pyridine and heated to 60-70° C. for one hour with 2 parts by weight of pulverized potassium hydroxide while stirring. After cooling down, petroleum ether of boiling range 30-60° C. is added, washed with 90 per cent. methyl alcohol and water, dried with sodium sulphate, and the solvent is evaporated, finally by means of vacuum.

Purification of the vitamin A methyl ether may be carried out by means of a percolation chromatogram through columns of weakly active aluminum oxide, by means of petroleum ether of boiling range 60-80° C. Thereby intermediates with one free hydroxyl group adhere to the aluminum oxide, whereas by-products, absorbing ultra-violet light at 280-310 mμ, are less well adsorbed and concentrate in the first runnings. The vitamin A methyl ether slowly moves through the column; during this process its position can easily be detected by means of its intensive yellow-green fluorescence in the ultra-violet light. The desired fraction is characterised by the stability of the Carr-Price colour reaction. The petroleum ether is evaporated and the purified vitamin A methyl ether thus obtained is distilled in a molecular still. It is a yellow oil of boiling point 90-95° C. under a pressure of $10^{-3}$ mm. Hg with its characteristic absorption maxima at 328 mμ. It is of high biological activity.

*Example 2*

4 parts by weight of 1-methoxy-3,7-dimethyl-7 - hydroxy - 9 - trimethyl - cyclohexenyl - nonatriene-(2,4,8) (prepared in accordance with Example 1) are dissolved in 40 parts by volume of acetic anhydride, whereupon 4 parts by weight of anhydrous sodium acetate are added and the mixture is refluxed for 2 hours. Excess acetic anhydride and the glacial acetic acid formed are then evaporated in vacuo and the residue is taken up in petroleum ether of boiling range 30-60° C. and water. The petroleum ether solution is successively washed with sodium bicarbonate solution and water, dried with sodium sulphate and concentrated. A yellow oil of boiling point 80-90° C. under a pressure of $10^{-5}$ mm. Hg is obtained. In the ultra-violet spectrum it shows absorption within the range characteristic for pentaenes (315–335 mμ); when tested on vitamin A-deficient rats it proves to be highly active.

The product can be purified according to the methods described in Example 1.

Example 3

10 parts by weight of 1-methoxy-3,7-dimethyl-7 - hydroxy - 9 - trimethyl - cyclohexenyl - nonatriene-(2,4,8), prepared in accordance with Example 1, are dissolved in 100 parts by volume of dioxane, 2.5 parts by weight of anhydrous oxalic acid are added, and the mixture is stirred for one hour at 80° C. After cooling down, the product is taken up in petroleum ether of boiling range 30–60° C., successively washed with 95 per cent. methyl alcohol and water, dried and the solvent is evaporated.

Example 4

2 parts by weight of 1-methoxy-3,7-dimethyl-7 - hydroxy - 9 - trimethyl - cyclohexenyl - nonadiene-(2,8)-yne-(4), prepared in accordance with Example 1, are refluxed for one hour with 5 parts by weight of pulverised zinc in 6 parts by volume of 80 per cent. acetic acid. Thus, partial hydrogenation of the triple bond and dehydration can be carried out in one single reaction step. After cooling down, the reaction product is taken up in petroleum ether of boiling range 30–60° C. and worked up as described in Example 1.

I claim:

1. Process for the manufacture of pentaenes, comprising condensing by means of a metal selected from the group consisting of zinc, magnesium and cadmium, β-ionone with an ether of 1 - hydroxy - 3 - methyl - 6 - halogeno - hexene - (2)-yne-(4) to produce a corresponding ether of 1 - hydroxy - 3,7 - dimethyl - 7 - hydroxy - 9 - trimethyl - cyclohexenyl - nonadiene - (2,8) - yne - (4) and treating said latter diene-yne by a process which successively comprises the steps of hydrogenating and dehydrating.

2. Process according to claim 1, comprising effecting the dehydration by esterifying with an organic acylating agent and subsequently splitting off acid by heating under alkaline conditions.

3. Process in accordance with claim 1, comprising effecting the dehydration by reacting with a phosphorus-halide and splitting off hydrogen halide from the halogeno compound formed by reacting with an alkaline compound.

4. Process for the manufacture of pentaenes, comprising condensing, by means of zinc, β-ionone with a low alkyl ether of 1-hydroxy-3-methyl-6-halogeno-hexene-(2)-yne-(4), hydrogenating the low alkyl ether of 1-hydroxy-3,7-dimethyl - 7 - hydroxy - 9 - trimethyl - cyclohexenyl-nonadiene-(2,8)-yne-(4) and subjecting to dehydration the low alkyl ether of 1-hydroxy-3,7 - dimethyl - 7 - hydroxy - 9 - trimethyl - cyclo-hexenyl-nonatriene-(2,4,8) formed.

5. Process for the manufacture of pentaenes, comprising condensing by means of zinc, β-ionone with 1-methoxy-3-methyl-6-bromo-hexene-(2)-yne-(4), partially hydrogenating at the triple bond, the 1-methoxy-3,7-dimethyl-7-hydroxy - 9 - trimethyl - cyclohexenyl - nonadiene-(2,8)-yne-(4) and dehydrating the 1-methoxy - 3,7 - dimethyl - 7 - hydroxy - 9 - trimethyl-cyclohexenyl-nonatriene-(2,4,8).

6. 1 - lower - alkoxy - 3,7 - dimethyl - 7 - hydroxy - 9 - trimethyl - cyclohexenyl - nonadiene - (2,8)-yne-(4).

7. 1 - methoxy - 3,7 - dimethyl - 7 - hydroxy - 9 - trimethyl - cyclohexenyl - nonadiene - (2,8) - yne-(4).

8. Process which comprises condensing β-ionone with 1-methoxy-3-methyl-6-halogeno-hexene-(2)-yne-(4) in the presence of zinc.

9. Process which comprises condensing β-ionone with an ether of 1-hydroxy-3-methyl-6-halogeno-hexene-(2)-yne-(4) in the presence of a member selected from the group consisting of zinc, magnesium and cadmium.

10. Process which comprises condensing β-ionone with 1-lower alkoxy-3-methyl-6-halogeno-hexene-(2)-yne-(4) in the presence of a member selected from the group consisting of zinc, magnesium and cadmium.

11. Process which comprises condensing β-ionone with 1-methoxy-3-methyl-6-halogeno-hexene-(2)-yne-(4) in the presence of a member selected from the group consisting of zinc, magnesium and cadmium.

12. Process which comprises condensing β-ionone with 1-methoxy-3-methyl-6-bromo-hexene-(2)-yne-(4) in the presence of zinc.

OTTO ISLER.

REFERENCES CITED

The following references are of record in the file of this patent:

UNITED STATES PATENTS

| Number | Name | Date |
|---|---|---|
| 2,412,465 | Milas | Dec. 10, 1946 |

OTHER REFERENCES

Kipping et al.: "Chemistry and Industry," vol. 58 (1939), page 802.

Oroshnik: "Jour. Amer. Chem. Soc.," vol. 67 (1945), pages 1627, 1628.